US009978120B2

(12) United States Patent
Bai et al.

(10) Patent No.: US 9,978,120 B2
(45) Date of Patent: May 22, 2018

(54) WARPING PANORAMIC IMAGES TO FIT A BOUNDARY

(71) Applicant: Adobe Systems Incorporated, San Jose, CA (US)

(72) Inventors: Xue Bai, Woodinville, WA (US); Jue Wang, Kenmore, WA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 63 days.

(21) Appl. No.: 15/268,299

(22) Filed: Sep. 16, 2016

(65) Prior Publication Data

US 2018/0082401 A1    Mar. 22, 2018

(51) Int. Cl.
*G06T 3/00* (2006.01)
*G06T 11/60* (2006.01)

(52) U.S. Cl.
CPC ............ *G06T 3/0093* (2013.01); *G06T 11/60* (2013.01); *G06T 2210/12* (2013.01)

(58) Field of Classification Search
None
See application file for complete search history.

(56) References Cited

PUBLICATIONS

Lombaert, Herve "Manual Registration with Thin Plates;" École Polytechnique de Montréal; Jun. 2006.
Bookstein, Fred L. "Principal Warps: Thin-Plate Splines and the Decomposition of Deformations;" IEEE Transactions on Pattern Analysis and Machine Intelligence; Jun. 1989.
He, Kaiming; Chang, Huiwen; Sun, Jian; "Rectangling Panoramic Images via Warping"; SIGGRAPH 2013; Jul. 2013.
Avidan, Shai; Shamir, Ariel; "Seam Carving for Content-Aware Image Resizing;" SIGGRAPH 2007; Jul. 2007.

*Primary Examiner* — Michelle Chin
(74) *Attorney, Agent, or Firm* — Keller Jolley Preece (57) ABSTRACT

The present disclosure is directed toward systems and method for warping a panoramic image to fit a predetermined shape using content-unaware warping techniques. For example, systems and methods described herein involve generating a mesh grid for a panoramic image with skewed edges by sampling boundary points around edges of the panoramic image and interpolated interior vertex points from the boundary points. Further, systems and methods described herein involve warping the mesh grid and underlying pixels of the panoramic image to fit a predetermined boundary. Further, systems and methods described herein involve generating the mesh grid and warping the panoramic image without consideration of content included therein and without overly-warping individual cells of the mesh grid and underlying pixels of the panoramic image.

20 Claims, 6 Drawing Sheets

WARPING PANORAMIC IMAGES TO FIT A BOUNDARY

BACKGROUND

Computing devices (e.g., computers, tablets, smart phones, digital cameras, wearable devices, etc.) provide numerous ways for people to capture, create, share, view, and otherwise interact with numerous types of digital content. As such, users are increasingly using computing devices to capture different types of digital images or photographs (or simply "digital photos"). For example, many computing devices enable users to capture and store panoramic digital images (or simply "panoramic images").

In many cases, computing devices capture a typical panoramic image by taking multiple images and stitching those images together in an elongated panoramic image. For example, many conventional systems for generating panoramic images involve a user holding and moving a camera, or other image capturing device (e.g., a mobile device), along a fixed line over a duration of time. Where the user fails to stay exactly along the fixed line or moves the camera at intermittent speeds resulting in bad alignment, a resultant panoramic image often includes a non-uniform shape that, results in an elongated image having various irregularities along the boundary of the resultant panoramic image. In addition to the bad alignment, another reason for shape irregularity is that panoramic images are often projected onto spherical or cylindrical surfaces that cause nonlinear transform of the boundaries. Therefore, such projected panoramic image often have an irregular shape.

Many conventional systems attempt to correct an irregular shape of a panoramic image by cropping or adding content to a panoramic image to generate an image that conforms to a predefined shape. For example, some conventional systems simply crop or add content to a panoramic image to cause the irregular shape of the panoramic image to conform to a rectangular shape. Simply cropping a panoramic image, however, often removes important features from the panoramic image. Additionally, adding content often causes portions of the panoramic image to include content that fails to blend with the rest of the image or otherwise detracts from the modified image.

As an alternative to cropping or adding content, many conventional systems cause a panoramic image to conform to a shape by warping portions of the panoramic image to conform to the predetermined shape. Conventional systems for warping a panoramic image, however, often cause noticeable distortion to various portions of the image. As a result, content within the panoramic image often gets stretched or distorted and disrupts the content of the panoramic image.

To overcome disruption caused by warping images, some conventional systems utilize content-aware warping techniques that analyze content within a panoramic image to avoid causing noticeable distortion when warping the panoramic image. For example, many conventional systems analyze pixels of a panoramic image to identify buildings, people, faces, objects, or other visual features within the content of a panoramic image and avoid stretching or modifying those regions of the panoramic image in such a way that disrupts those identified features of the image. Utilizing content-aware warping techniques, however, involves analyzing content of an image, and often becomes computationally prohibitive depending on the complexity of the individual images being stitched together. As such, many computing devices experience difficulty or take a long time to implement content-aware warping techniques. Furthermore, where an image includes dense or clustered features within the captured image, many content-aware warping techniques fail to warp the image without causing noticeable distortion throughout the panoramic image.

These and other problems exist with regard to modifying a panoramic image.

SUMMARY

Embodiments of the present disclosure provide benefits and/or solve one or more of the foregoing and other problems in the art with systems and methods for warping panoramic images. In particular, the disclosed systems and methods generate an enhanced panoramic image without regard to image content by warping a panoramic digital image having skewed boundaries to fit a predetermined shape.

For example, the systems and methods disclosed herein receive an input panoramic digital image (or simply "panoramic image") that has skewed boundaries. The systems and methods further generate a boundary of points around the skewed edges of the panoramic image and generate a mesh grid having interior points throughout the panoramic image in accordance with a position of the points around the edges of the panoramic image. In particular, the systems and methods described herein generate the mesh grid by interpolating interior points throughout an interior of the mesh grid based on a relative position of the pounds around the boundary of the mesh grid and without regard to the content of the panoramic image.

Further, upon generating the mesh grid, the systems and methods described herein generate an enhanced panoramic image by warping the panoramic image to fit the predetermined shape. In particular, the systems and methods described herein warp the generated mesh grid and underlying pixels of the panoramic image to fit the predetermined shape. Further, the systems and methods described herein reduce over-warping localized portions of the panoramic image by limiting how much individual cells of the mesh grid are warped. In particular, the systems and methods distribute warping of the panoramic image evenly across the cells of the mesh grid to avoid over-warping localized regions of the panoramic image.

Additional features and advantages will be set forth in the description which follows, and in part will be obvious from the description, or may be learned by the practice of such exemplary embodiments.

BRIEF DESCRIPTION OF THE DRAWINGS

Various embodiments will be described and explained with additional specificity and detail through the use of the accompanying drawings in which.

DETAILED DESCRIPTION

One or more embodiments of the present disclosure include an image warping system that warps a panoramic digital image (or simply "panoramic image") to fit a predetermined shape. The image warping system generates an enhanced panoramic image with a uniform shape from a panoramic image with a skewed or otherwise irregular shape. More particularly, the image warping system generates the enhanced panoramic image in a content-unaware manner without skewing portions of the panoramic image in a way that disrupts content within the panoramic image. Content-unaware, as used herein, refers to features and functionality of the present disclosure that are independent of content displayed by a panoramic image. For example, warping a panoramic image in a content-unaware manner involves warping a panoramic image without consideration of underlying pixels or visual features (e.g., buildings, people, faces, objects) of the panoramic image. As another example, identifying boundary points and/or interior points of the panoramic image in a content-unaware manner involves identifying points around and throughout the panoramic image without consideration of underlying pixels of visual features of the panoramic image.

As will be explained in further detail below, the image warping system causes the panoramic image to conform to the predetermined shape by generating a mesh grid having cells evenly distributed throughout the panoramic image with the skewed or otherwise irregular shape. The image warping system subsequently warps the mesh grid and underlying panoramic image to the predetermined shape.

More particularly, the image warping system generates a mesh grid including cells that are evenly distributed across the panoramic image with the skewed or otherwise irregular shape. Thus, the mesh grid also includes a skewed or otherwise irregular shape. The image warping system warps the mesh grid and the underlying panoramic image to fit a predetermined shape (e.g., a rectangle). In warping the mesh grid and underlying image, the image warping system reduces disruption of the content within the panoramic image by limiting how much individual cells of the mesh grid are warped. In particular, the image warping system warps the mesh grid and underlying panoramic image to fit the predetermined shape while distributing distortion of the panoramic image across all cells of the mesh grid. In this way, the image warping system prevents overly distorting localized regions of the panoramic image.

As mentioned above, the image warping system generates a content-unaware mesh grid for the panoramic image. In one or more embodiments, prior to initializing the mesh grid, the image warping system preprocesses the panoramic image by cropping, scaling, or otherwise modifying the panoramic image to serve as a template for generating the mesh grid. For example, in one or more embodiments, the image warping system crops an input image to a bounding box of solid pixels and/or scales the image down to a smaller resolution. Further, where corners of the panoramic image are not already known, the image warping system can identify corners of the panoramic image to use as corner points of the content-unaware mesh grid.

In one or more embodiments, the image warping system initializes the mesh grid by sampling boundary points along the outside edges of the panoramic image having skewed boundaries. For example, where corner points are not previously known, the image warping system identifies corner points of the panoramic image and generates boundary points that are evenly distributed between the corner points of the panoramic image. The image warping system utilizes the boundary points to further generate interior vertex points of the mesh grid. In particular, the image warping system sets each of the boundary points as control points and interpolates coordinates for interior vertex points of the mesh grid based on the boundary points. For example, based on the number and position of the boundary points, the image warping system determines a number of interior vertex points that define a number of rows and columns.

Once the mesh grid is generated, the image warping system applies the mesh grid to the panoramic image and warps the mesh grid and underlying panoramic image to a new boundary having a predetermined shape (e.g., a rectangle). For example, as will be described in greater detail below, the image warping system warps the mesh grid to fit a bounding box having the predetermined shape. In addition, the image warping system utilizes a global warping process that distributes distortion of the mesh grid across all of the cells of the mesh grid. For example, the image warping system warps the mesh grid while encouraging as similar as possible a transform to individual mesh cells across the entire mesh gird. In other words, the image warping system stretches the mesh grid to fit the bounding box (or other predetermined shape) by stretching the boundaries of the mesh grid to the bounding box and distributing the distortion of the cells throughout the mesh grid. The distribution of the distortion of the cells advantageously minimizes deviations from a similarity transform applied to the cells that make up the mesh grid. In this way, the image warping system minimizes localized warping of the panoramic image that would otherwise disrupt the content of the panoramic image.

As mentioned above, one or more embodiments of the image warping system warp a panoramic image having a skewed boundary using a content-unaware process. That is, in contrast to conventional systems for warping an image that perform a computationally prohibitive analysis of the content of individual images to generate a panoramic image, the disclosed image warping system advantageously generates a content-unaware mesh grid that bypasses the need to analyze content of the panoramic image. In particular, the image warping system generates the mesh grid without consideration of the content shown in the panoramic image and warps the cells of the mesh grid (as well as corresponding portions of the panoramic image underlying the mesh grid). Thus, in contrast to context-aware methods, the image warping system implements a computationally inexpensive warping of a panoramic image. Thus, the image warping system requires less data than conventional systems to warp a panoramic image. Despite the use of less data, the image warping system still achieves the same or better output image quality that state of the art content-aware systems.

Additionally, one or more embodiments of the image warping system avoid issues caused by content-aware warping techniques in cases where a panoramic image has uneven distribution of content. In particular, rather than carving out portions of the panoramic image that are not to be altered in any way, thus causing over-distortion of other portions of the panoramic image, the image warping system avoids overly warping localized portions of the panoramic image by generating a content-unaware mesh grid having evenly distributed cells across the panoramic image. The image warping system the warps each of the cells evenly to avoid overly disrupting localized regions of the panoramic image.

Further, the image warping system avoids computationally expensive analysis and seam-carving of the panoramic image by generating the content-unaware mesh grid. In this way, the image warping system improves function of a computing device by warping a panoramic image while requiring minimal computing processing time and power. Indeed, the image warping system provides an elegant solution to a complex problem that imposes minimal processing power to complete a warping by avoiding the need to analyze content of the panoramic image.

Additional detail will now be provided regarding the image warping system in relation to illustrative figures portraying exemplary embodiments. FIGS. 1-6 illustrate an example of warping a panoramic image having a skewed boundary to an enhanced panoramic image that fits a rectangular shape in accordance with one or more embodiments herein. It is appreciated that FIGS. 1-6 illustrate one example of warping a panoramic image to fit a predetermined shape and that features and functionality described with regard to FIGS. 1-6 can similarly apply to warping images of different shapes or dimensions having skewed boundaries to many different shapes.

Figure 1:
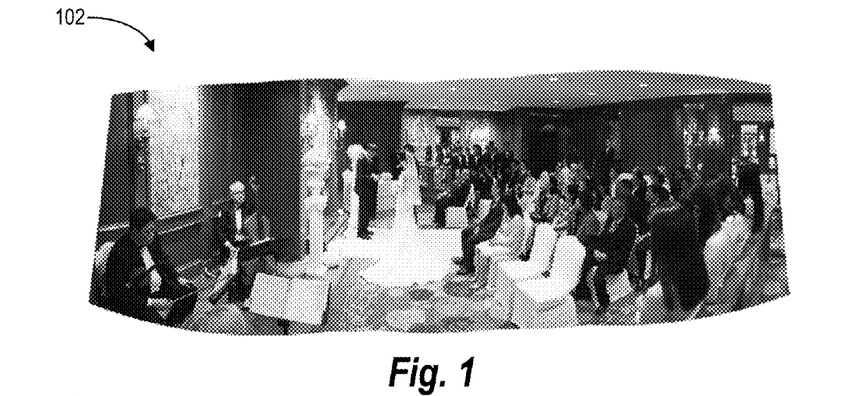
FIG. 1 illustrates a panoramic digital image having skewed boundaries in accordance with one or more embodiments.

In accordance with one or more embodiments, FIG. 1 illustrates an example panoramic digital input image 102 (or simply "input image 102"). As used herein a "panoramic image" or panoramic digital image" refers to an image having an elongated shape. In one or more embodiments, a panoramic digital image refers to a series of images stitched together to form an elongated image. For example, in one or more embodiments, a panoramic image refers to a stitched together series of images captured by a camera or other image capturing device (e.g., a mobile device) as it rotates or otherwise moves along a direction over a duration of time. For example, in one or more embodiments, a user holds a mobile device that captures and stitches together a series of pictures taken while the user horizontally or vertically moves the mobile device. Moreover, in one or more embodiments, a panoramic image refers to a four channel red green blue alpha (RGBA) image. In particular, a panoramic image may refer to an elongated digital image including red green blue (RGB) colors in addition to alpha (A) channel information.

As shown in FIG. 1, a horizontally oriented input image 102 includes a skewed boundary around the edges of the input image 102. As used herein, a "skewed boundary" refers to a boundary of a panoramic digital input image prior to modifying the panoramic digital image to fit a predetermined shape. In one or more embodiments, the skewed boundary refers to a boundary including non-continuous and/or non-uniform edges around an outside of the panoramic digital input image. A skewed boundary may result from, for example, from tilt and/or roll of a digital camera in capturing a panorama digital image.

For example, as shown in FIG. 1, the input image 102 includes wavy edges along the top and bottom of the input image 102 as well as tilted sides. In one or more embodiments, the irregularities around the edges of the input image 102 are caused by human error when capturing the input image 102. For example, in one or more embodiments, the irregularities around the edge of the input image 102 are caused as a result of a user tilting a camera and/or moving the camera up and down while spanning from left to right while capturing the input image 102.

As will be described in further detail below, the image warping system uses the input image 102 to construct a mesh grid. When the input image 102 includes an RGBA image, the image warping system can ignore the red green blue (RGB) channels of the input image 102 when generating the mesh grid. Thus, one or more embodiments involve constructing the mesh grid without utilizing data from the RGB channels of the input image 102. As such, in one or more embodiments, the image warping system exclusively utilizes the information contained in the A-channel (Alpha channel) when determining modifications to make to the input image 102.

Additionally, in one or more embodiments, the image warping system down-samples or otherwise generates a reduced resolution version of the input image 102. For example, in preparation for generating the mesh grid, the image warping system crops or resizes the input image 102 to a bounding box of solid pixels and scales down the resolution of the input image 102 to lower resolution than an original version of the input image 102 (e.g., as captured). In this way, rather than modifying a full-resolution version of the input image 102, the image warping system modifies a down-sampled version of the input image 102 using a less computationally expensive process than modifying a full-resolution version of the input image 102.

As mentioned above, the image warping system can generate a mesh grid that overlays the input image 102. As used herein, a "mesh grid" refers to a grid of cells defined by an outer boundary and lines passing between edges of the boundary and through interior vertex points distributed throughout an interior portion of the boundary. The mesh grid can include a height and width defined by a number of cells along each edge of the boundary. In one or more embodiments, the image warping system generates a mesh grid by sampling points between corners points 204a-d of the input image 102. As used herein, "corner points" refer to points along a boundary of a panoramic digital image closes to a respective corner of a bounding box that encloses the panoramic digital image. In one or more embodiments, a panoramic digital image includes four corner points corresponding to respective corners of the bounding box. As an example, each corner point refers to a point on the panoramic digital image having the lowest Euclidean distance from a respective corner of the bounding box.

Figure 2:
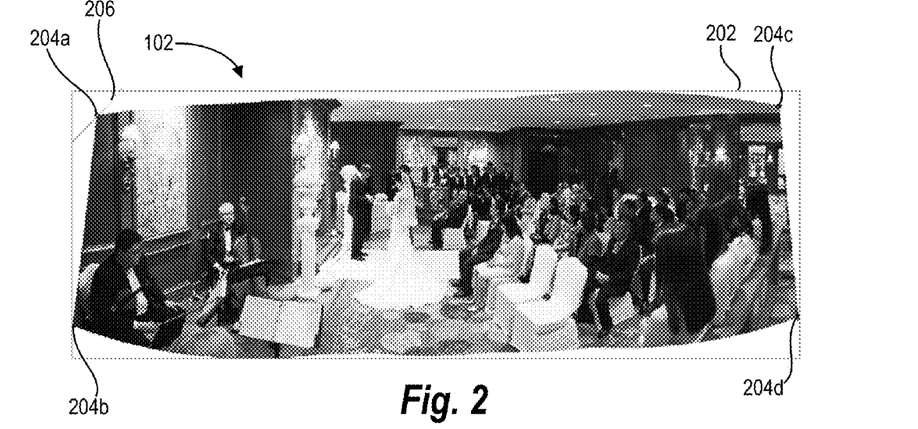
FIG. 2 illustrates a boundary having a defined shape around the panoramic digital image in accordance with one or more embodiments.

For example, as shown in FIG. 2, the input image 102 includes corner points 204a-d at respective corners of the input image 102. In one or more embodiments, the corner points 204a-d are known or otherwise received when the image warping system receives the input image 102. For example, in one or more embodiments, the corner points are included within metadata of the input image 102. Alternatively, in one or more embodiments, the image warping system identifies the corner points 204a-d of the input image.

In one or more embodiments, the image warping system identifies the corner points 204*a*-*d* by generating a bounding box 202 and identifying corner points 204*a*-*d* of the input image 102 utilizing the bounding box 202. As shown in FIG. 2, the image warping system generates a bounding box 202 that encloses the input image 102. In one or more embodiments, the image warping system generates a bounding box 202 having dimensions that completely enclose the input image 102 without having any side of the bounding box 202 extending beyond outer edges of the input image 102. Alternatively, in one or more embodiments, generating the bounding box 202 involves generating a box having length and width dimensions that ensure each of the corners of the bounding box 202 extend beyond any portion of the input image 102. Moreover, in one or more embodiments, the bounding box 202 represents the desired dimensions of a predetermined shape of an enhanced panoramic digital image as described below in connection with FIG. 6. Thus, in one or more embodiments, the bounding box 202 represents dimensions of a rectangle after warping the input image 102 in accordance with one or more embodiments described herein.

Upon generating the bounding box 202, the image warping system identifies the corner points 204*a*-*d* of the input image 102 based on corresponding corners of the bounding box 202. In one or more embodiments, the image warping determines the corner points 204*a*-*d* of the input image 102 by determining the closest point on the input image 102 to each respective corner of the bounding box 202. For example, as illustrated in FIG. 2, the image warping system calculates the corners 204*a*-*d* by utilizing a 45-degree line 206 pushed from a corner of the bounding box 202 toward the input image 102 (e.g., enclosed within the bounding box 202). As shown in FIG. 2, the first corner point 204*a* of the input image 102 corresponds to a first point on the input image 102 to touch the 45-degree line 206 as the 45-degree line pushes out from the corresponding corner of the bounding box 202. The image warping system further calculates each of the second corner point 204*b*, third corner point 204*c*, and fourth corner point 204*d* of the input image 102 by similarly pushing a 45-degree line from corresponding corners of the bounding box 202 toward the input image 102.

Upon identifying corner points 204*a*-*d* of the input image 102, the image warping system further generates boundary points 302 around the edges of the input image 102. As used herein, "boundary points" refer to distributed points around a boundary of a panoramic digital image. In one or more embodiments, boundary points refer to a uniform distribution of points around a perimeter of the panoramic digital image. Boundary points can include horizontal points along a top or bottom edge of the panoramic digital image as well as vertical points along side edges of the panoramic digital image.

Figure 3:
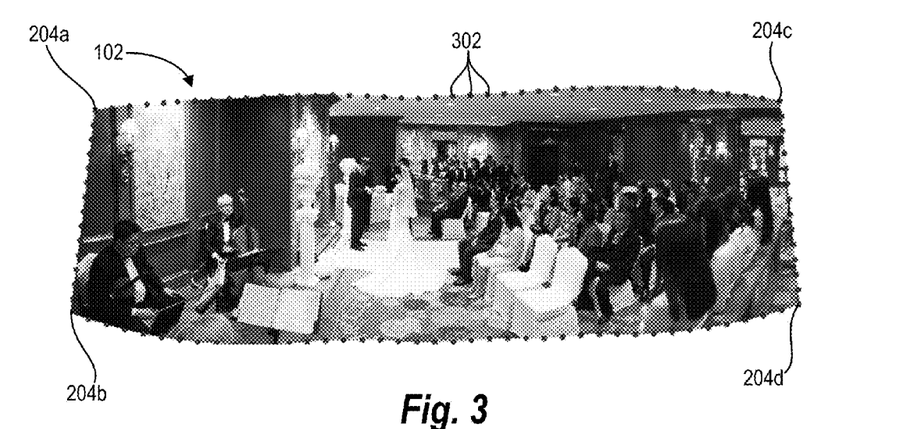
FIG. 3 illustrates the panoramic digital image having sampled boundary points along outside edges of the panoramic digital image in accordance with one or more embodiments.

For example, as shown in FIG. 3, the image warping system samples boundary points 302 around a perimeter of the input image 102. In one or more embodiments, the image warping system generates the boundary points 302 by uniformly sampling points around the edges of the input image 102. As shown in FIG. 3, the image warping system uniformly samples boundary points 302 that extend between the corner points 204*a*-*d* of the input image 102.

In one or more embodiments, the image warping system determines a number of boundary points 302 based on an aspect ratio of the bounding box 202 around the input image 102. In particular, in one or more embodiments, the image warping system determines a number of horizontal and vertical boundary points 302 based on a width to height ratio of the input image 102 (or bounding box 202). For example, as shown in FIG. 3, where the bounding box 202 forms a rectangle having a horizontal orientation in which a horizontal width of the bounding box 202 is considerably larger than a vertical height of the bounding box 202, the image warping system samples more horizontal boundary points 302 than vertical boundary points 302.

To illustrate, as shown in FIG. 3, the image warping system generates boundary points 302 including 41 horizontal boundary points 302 and 15 vertical boundary points. Thus, as shown in FIG. 3, the boundary points 302 include 41 evenly distributed horizontal points extending from the first corner point 204*a* to the third corner point 204*c* (and similarly from the second corner point 204*c* to the fourth corner point 204*d*). As further shown, the boundary points include 15 vertical points extending from the first corner point 204*a* to the second corner point 204*b* (and similarly from the third corner point 204*c* to the fourth corner point 204*d*) In one or more embodiments, this 41×15 ratio is based on a 41×15 width to height ratio of the bounding box 202. As such, the boundary points 302 shown in FIG. 3 forms the outer frame of a 40×14 cell mesh grid.

Upon generating the boundary points 302, the image warping system continues generating the mesh grid by utilizing the boundary points 302 as control points for determining locations of vertex points to make up the interior of the mesh grid. As used herein "vertex points" refer to points distributed throughout an interior portion of a boundary of a panoramic digital image. As described in further detail herein, the interior vertex points may include points that are uniformly distributed throughout a panoramic digital input image having skewed boundaries. Additionally, as described in greater detail below, the interior vertex points may define intersections of lines that form a mesh grid.

Figure 4:
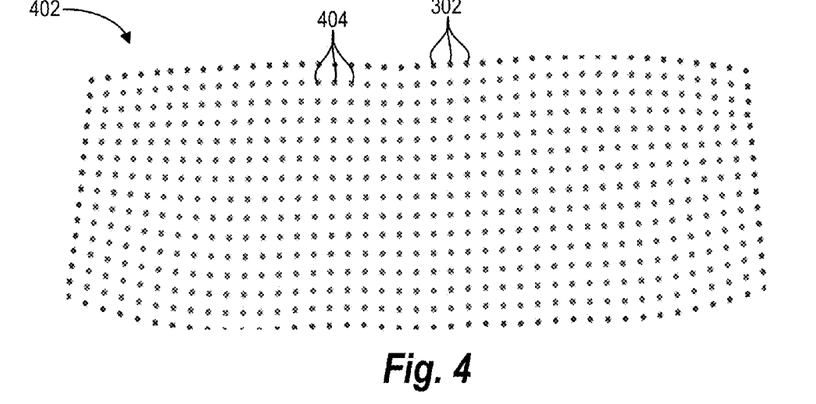
FIG. 4 illustrates a mesh grid having boundary points and interior vector points in accordance with one or more embodiments.

For example, as shown in FIG. 4, the image warping system utilizes the boundary points 302 to generate interior vertex points 404 that make up a mesh array 402 that defines a mesh grid corresponding to the input image 102. In particular, in one or more embodiments, the image warping system generates the interior vertex points 404 of the mesh array 402 by interpolating coordinates for each interior vertex point collectively from the boundary points 302.

As shown by FIG. 4, the interior vertex points are evenly distributed based on the boundary points. In other words, the boundary points sampled along the sides of the panorama image 102 dictate the number of rows of vertex points. Similarly, the boundary points sampled along the top and bottom of the panorama image 102 dictate the number of columns of vertex points. With the dictated number of rows can columns, the image warping system evenly distributes the vertex points such that they are equally spaced and uniform to the extent possible.

Figure 5:
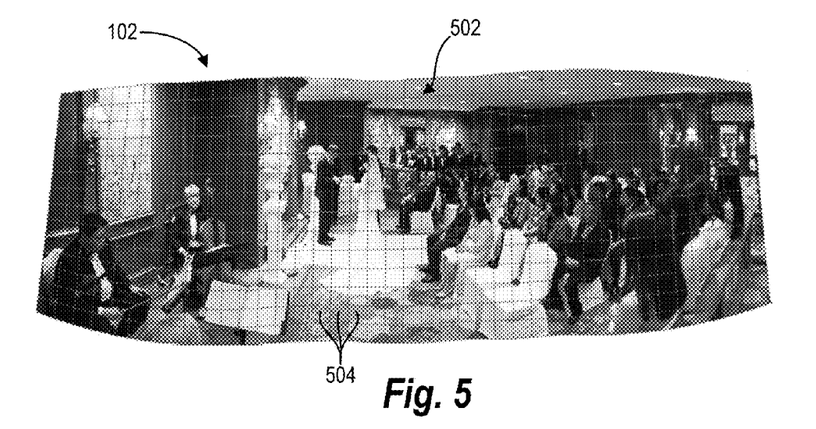
FIG. 5 illustrates a mesh grid and underlying panoramic digital image in accordance with one or more embodiments.

After generating the mesh array 402 including boundary points 302 and interior vertex points 404, the image warping system generates a mesh grid 502 including grid cells 504 evenly distributed across the underlying input panorama image 102. In particular, as shown in FIG. 5, the mesh grid 502 includes grid cells 504 defined by lines passing through the boundary points 302 and interior vertex points 404. As shown in FIG. 5, the image warping system applies the mesh grid 502 over the input image 102.

In one or more embodiments, the image warping system forms the mesh grid 502 by connecting adjacent boundary points 302 and interior vertex points 404. Alternatively, in one or more embodiments, the image warping system smooths the lines connecting the boundary points 302 and/or interior vertex points 404 to avoid noisy or fractal edges or lines of the mesh grid 502. It is appreciated that the lines of the mesh grid 502 around the edges of the input image 102 need not touch the boundary of the image 102.

As shown by FIG. 5, the mesh grid 502 has an irregular shape corresponding to the irregular shape of the input panorama image 102. Thus, the image warping system fits the mesh grid 502 to the irregular shape of the input panorama image 102. Furthermore, in one or more embodiments, the image warping system fits the mesh grid 502 to the input panorama image 102 prior to any manipulation of the content of the input panorama image 102. For example, the image warping system fits the mesh grid 502 to the input panorama image 102 prior to any warping or stretching of the input panorama image 102.

As mentioned above, in one or more embodiments, the image warping system smooths the edges and/or crops the input panorama image 102 prior to generating the mesh grid 502. Notwithstanding any smoothing or cropping, the input panorama image 102 retains an irregular shape to which the image warping system fits a mesh grid 502.

In addition to the foregoing, the creation of the mesh grid 502 and its application to the input panorama image 102 is independent of the content of the input panorama image 102. For example, in one or more embodiments, the only input required for creating the mesh grid 502 is the shape of the outer boundary of the input panorama image 102. In the case of an RGBA image, the image warping system considers only the A-channel (Alpha channel) of the input panorama image 102 when generating the mesh grid 502.

Figure 6:
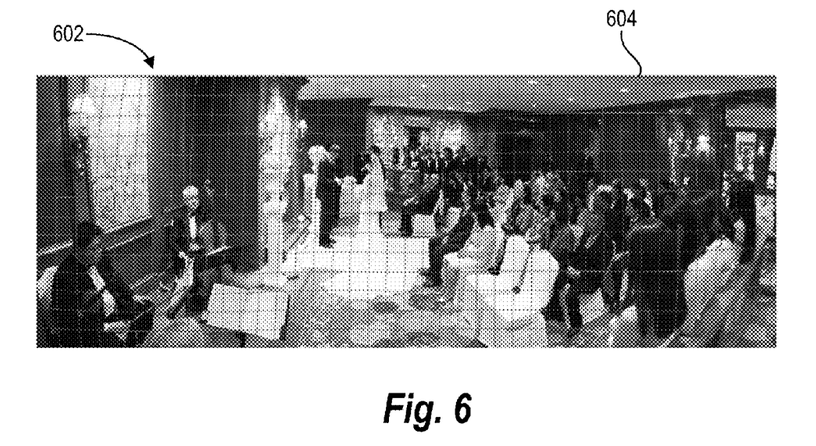
FIG. 6 illustrates warped panoramic image in accordance with one or more embodiments.

Once the mesh grid 502 is generated and applied to the input image 102, the image warping system warps the mesh grid 502 and underlying input image 102 to a predetermined shape. For example, as shown in FIG. 6, the image warping system warps the mesh grid 502 and underlying input image 102 to generate an enhanced panoramic image 602 that fits a boundary 604 having a rectangular shape. In one or more embodiments, the rectangular boundary 604 has the same shape and dimensions as the boundary box 202 used to identify the corner points 204a-d of the input image 102. In one or more embodiments, the dimensions of the boundary box 202 are used based on determining the desired dimensions of the rectangular boundary 604.

As mentioned above, the image warping system generates the enhanced panoramic image 602 by warping the mesh grid 502 and underlying input image 102 evenly across the grid cells 504 of the mesh grid 502. For example, as shown in FIG. 6, the image warping system globally warps the mesh grid 502 to fit the rectangular boundary 604 while limiting distortion of individual grid cells 504 of the mesh grid 502. In this way, the image warping system distributes distortion of the mesh grid 502 and underlying input image 102 to generate the enhanced panoramic image 602 without disrupting the content displayed in the input image 102.

In warping the mesh grid 502 and underlying input image 102, the image warping system minimizes deviation of the grid cells 504 of the mesh grid. In particular, the image warping system minimizes distortion throughout the enhanced panoramic image 602 by minimizing deviation of grid cells 504 from a similarity transform applied to the plurality of grid cells 504 that make up the mesh grid 502. For example, in one or more embodiments, the image warping system applies an energy function (e.g., energy heuristic) that preserves shapes and straight lines of the mesh grid 502. More particularly, the image warping system may optimize one or more global energy functions that describe the positioning of the mesh grid 502. In one or more embodiments, the global energy functions may include a function that causes the mesh grid 502 to fill the target shape, a function that preserves straight lines, and a function that preserves high-level properties such as shapes. The image warping system can optimize the functions by finding a lowest global energy for the combination of the one or more global energy functions. Example, global energy functions are discussed in greater detail below.

Moreover, while the above description relates specifically to warping an input image 102 to fit the rectangular boundary 604, it is appreciated that one or more embodiments of the image warping system utilize a total energy function and system of equations to warp an input panoramic image having skewed boundaries to other shapes or dimensions. For example, in one or more embodiments, the image warping system warps an input panoramic image to a circular shape, oval shape (or other predetermined shape) by imposing a hard boundary constraint reflective of a circle, oval or other predetermined shape and similarly minimizing a total energy function including a shape preservation constraint that minimizing warping of interior cells of a mesh grid generated for the input panoramic image. Thus, using similar principles and features as described above in connection with warping the mesh grid 502 and underlying input image 102 to fit the rectangular boundary 604 can apply to warping an input panoramic image to a variety of shapes or dimensions.

Further, upon minimizing the energy function to determine how to warp the input image 102, the image warping system can triangulate the warped mesh grid to fit the warped input image 102 to the rectangular boundary 604. In one or more embodiments, the image warping system warps the input image 102 to fit the rectangular boundary 604 using barycentric coordinates inside each triangle. Additionally, the image warping system warps all of the RGBA channels together. For example, in generating and warping the mesh grid, the image warping system considers only the A-channel (Alpha channel) of the input image 102 and warps the mesh grid and A-channel of the input image 102 prior to applying the RGB channel information to the warped dimensions of the input image 102. Thus, in one or more embodiments, the image warping system analyzes the A-channel exclusively in generating the mesh grid and warping the input image 102 to fit the rectangular boundary 604 and adds the RGB channel data to the warped image in accordance with the A-channel data.

Figure 7:
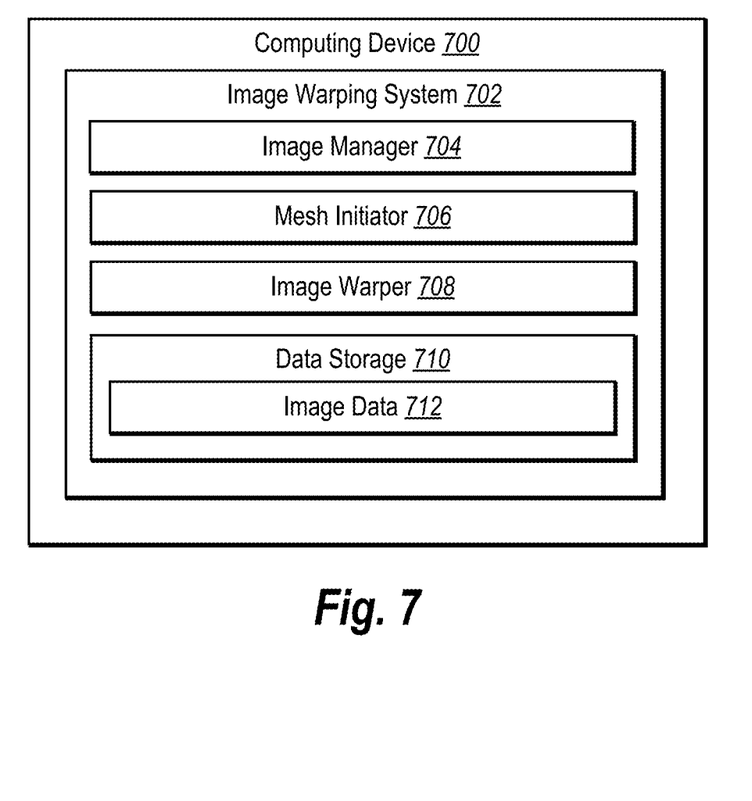
FIG. 7 illustrates a schematic diagram of an example image warping system in accordance with one or more embodiments.

Turning now to FIG. 7, additional detail will be provided regarding components and capabilities of an example architecture for an image warping system 702 that may be implemented on a computing device 700 in accordance with one or more embodiments. In particular, FIG. 7 illustrates an example embodiment of a computing device 700 having an image warping system 702 thereon that accomplishes features and functionality associated with one or more embodiments described above. For example, the image warping system 702 generates an enhanced panoramic image by warping an input image 102 with skewed edges to a predetermined shape. As shown in FIG. 7, the image warping system 702 includes an image manager 704, a mesh initiator 706, an image warper 708, and data storage 710 including, for example, image data 712.

As illustrated in FIG. 7, the image warping system 702 includes an image manager 704. In particular, the image manager 704 receives or otherwise obtains a panoramic digital image (e.g., input image 102 or simply "panoramic image") with skewed edges. In one or more embodiments, the image manager 704 captures the panoramic image by capturing a series of images and stitching the images together to form the panoramic image with skewed boundaries. Alternatively, in one or more embodiments, the image manager 704 receives the panoramic image (e.g., from another device).

In one or more embodiments, the image manager 704 analyzes the panoramic image to determine features and properties of the panoramic image prior to generating a mesh grid and/or warping the panoramic image. For example, in one or more embodiments, the image manager 704 crops and/or scales down the panoramic image to a lower resolution. In one or more instances, the image manager 704 crops portions of the panoramic image and scales the panoramic image to 1500 pixels (or other resolution of pixels based on a length dimension of the panoramic image). In one or more embodiments, the image manager 704 scales the panoramic image to a number of pixels based on an aspect ratio of the panoramic image.

Additionally, in one or more embodiments, the image manager 704 determines corner points 204a-d of the panoramic image. For example, in one or more embodiments, the image manager 704 receives corner data (e.g., metadata) including corner points 204a-d when receiving the panoramic image. Alternatively, in one or more embodiments, the image manager 704 determines the corner points 204a-d by generating a bounding box 202 and identifying the closest point of the panoramic image to each of the corners of the bounding box 202. In one or more embodiments, the bounding box 202 has similar dimensions as the predetermined shape of a final output image (e.g., the enhanced panoramic image 602).

One example algorithm for determining the location of the corners 204a-d with respect to the corners of the bounding box 202 is:

$$d(A,B) = |x_A - x_B| + |y_A - y_B|$$

where d(A, B) represents a total displacement between a corner of the input image 102 and a corresponding corner of the bounding box 202 while $x_A - x_B$ and $y_A - y_B$ represent the horizontal and vertical displacement between the corner of the input image 102 and the corresponding corner of the bounding box 202, respectively (see FIG. 2). As shown in FIG. 2, the foregoing algorithm identifies the closest point of the panorama image to a respective corner of the bounding box 202. In particular, the algorithm performs a distance transform from a corner of the bounding box and find the minimal value on a distance map from the corner.

As further shown in FIG. 7, the image warping system 702 includes a mesh initiator 706. In particular, the mesh initiator 706 generates a mesh grid on the panoramic image with skewed boundaries by generating a mesh array 402 including boundary points 302 and interior vertex points 404. The mesh initiator 706 first samples boundary points 302 along outside edges of the panoramic image. In one or more embodiments, the mesh initiator 706 uniformly samples boundary points 302 along the outside edges of the panoramic image. For example, in one or more embodiments, the mesh initiator 706 uniformly samples boundary points 302 between identified corner points 204a-d of the panoramic image. In one or more embodiments, the mesh initiator 706 determines a number of boundary points 302 along each of the sides of the panoramic image based on an aspect ratio of the panoramic image, the bounding box 202, and/or a desired predetermined shape of a warped panoramic image (e.g., enhanced panoramic image 602).

Upon generating the boundary points, the mesh initiator 706 further generates the mesh array 402 by generating a plurality of interior vector points 404. In particular, the mesh initiator 706 generates interior vertex points 404 distributed across an interior portion of the panoramic image by interpolating coordinates of each of the interior vertex points 404 form the boundary points 302. In one or more embodiments, the mesh initiator 706 distributes the interior vertex points 404 evenly across the panoramic image by interpolating a location of each respective interior vertex point 404 based on a positional difference between a given interior vertex point 404 and each of the boundary points 302 around the panoramic image.

In one or more embodiments, the image warping system interpolates the interior vertex points 404 utilizing a thin plate splines calculation technique. For example, the image warping system determines a displacement at different points of the mesh array 402 to determine a placement of each of the interior vertex points 404 with respect to the boundary points 302 of the mesh array 402. In particular, in one or more embodiments, the image warping system interpolates each of the interior vertex points 404 using the following interpolation equation:

$$f(x, y) = a_1 + a_2 x + a_3 y + \sum_{i=1}^{n} \omega_i U(|P_i - (x, y)|)$$

where $\alpha_1$, $\alpha_2$, $\alpha_3$, and $\omega_1$ represent coefficients to be determined. $U(r) = r^2 \log(r)$ refers to a radial basis function of a Euclidean point distance (r). $P_i$ refers to the i-th control point (e.g., i-th boundary point 302). Thus, $|P_i - (x,y)|$ refers to a distance (e.g., The Euclidean point distance (r)) between a control point (P) and a position (x,y).

In one or more embodiments, the image warping system solves the coefficients using the following linear system:

$$\begin{bmatrix} K & P \\ P' & 0 \end{bmatrix} \begin{bmatrix} W \\ a_1 \\ a_2 \\ a_3 \end{bmatrix} = Y,$$

where P represents the control point positions represented by the following equation:

$$P = \begin{bmatrix} 1 & x_1 & y_1 \\ \dots & \dots & \dots \\ 1 & x_n & y_n \end{bmatrix},$$

K represents an evaluation of the function U(r) between control points, and is represented using the following equation:

$$K = \begin{bmatrix} U(r_{11}) & U(r_{12}) & \dots \\ U(r_{21}) & U(r_{22}) & \dots \\ \dots & \dots & U(r_{nn}) \end{bmatrix},$$

and W and Y are represented using the following equations:

$$W = [\omega_1 \dots \omega_n]'$$

$$Y = [v_1 \dots v_n\ 0\ 0\ 0]',$$

where W refers to weighted coefficient values ($\omega$) for each control point (e.g., boundary point 302) and Y refers to the height of control points for the mesh array 402, padded with zeros. It is appreciated that the image warping system can use a similar system of equations with respect to the horizontal position of the control points of the mesh array 402 to calculate the coefficients of the linear system.

As used herein, an "x-y position" of the mesh array 402 refers to a position within the array with respect to boundary points 302 around the perimeter of the mesh array 402. For example, a point on the mesh array 402 at the most bottom-left position of the mesh array 402 would have an x-y position of (0,0). An adjacent point to the right of the (0,0) position would refer to an x-y position of (1,0). Further, an interior vertex point three spots to the right of the left-most boundary points 302 and three spots above the bottom-most boundary points 302 would refer to an interior vertex point having an x-y position of (3,3). Thus, the x-y position refers to a position within the mesh array 402.

Further, as used herein, an "x-y coordinate," "x-y displacement," "x-displacement," "y-displacement" or simply "displacement" refers to a physical position on an x-y plane (or other two-dimensional plane). For example, an x-y coordinate or displacement value provides a physical position with regard to a fixed plane or predetermined shape. Thus, the x-y coordinate or displacement of a boundary point 302 or interior vertex point 404 may refer to a position of the boundary point 302 or interior vertex point 404 with respect to the bounding box 202 or desired shape of the enhanced panoramic image.

Thus, as described above with regard to the interpolation equation and system of equations, the image warping system calculates coefficients based on a distribution of the boundary points 302 around the input image 102 (e.g., with respect to the desired dimensions of a rectangular image). As demonstrated in the equations above, in calculating the coefficients, the image warping system calculates weighting coefficients ($\omega_{1-n}$) for each boundary point 302 on the mesh array 402 corresponding to horizontal and vertical positions of boundary points 302 on the mesh array 402.

Upon calculating the coefficients $\alpha_1$, $\alpha_2$, $\alpha_3$, and $\omega_i$, the image warping system plugs the coefficients $\alpha_1$, $\alpha_2$, $\alpha_3$, and $\omega_i$ into the above-described interpolation equation and solves a horizontal and vertical positional displacement for each of the interior vertex points 404. As shown by the interpolation equation and the system of equations above, the image warping system utilizes the weighting coefficients to weigh different control values (e.g., boundary points 302) differently based on the x-y position of a given interior vertex point 404 with respect to the boundary points 302. For example, the image warping system utilizes the weighting coefficients to weigh boundary points 302 nearby a given interior vertex point 404 more heavily than boundary points 302 that are further away from the given interior vertex point 404. To illustrate, the image warping system weighs the first boundary point 204a and other nearby border points 302 more heavily to determine a x-y displacement of interior vertex points 404 toward the top-left corner of the mesh array 402 than the fourth corner point 204d and other border points 302 nearby the fourth corner point 204d.

Nevertheless, while the image warping system weighs different boundary points 302 more heavily for different interior vertex points 404, in one or more embodiments, the image warping system considers a combination of all of the boundary points to determine x-y coordinates of each of the interior vertex points 404 within the mesh array 402. For example, as shown in the interpolation equation above, the image warping system calculates a sum of distances between boundary points 302 and an interior vertex point corresponding to an x-y position to determine a displacement for the interior vertex point. Thus, while the image warping system considers nearby boundary points 302 more heavily than more distant boundary points 302 in calculating the sum of distances, the image warping system nonetheless considers all of the boundary points 302 in determining a displacement (e.g., x-y coordinate) of each of the interior vertex points 404.

Once the mesh initiator 706 generates the mesh array 402 including the boundary points 302 and interior vertex points 404, the mesh initiator 706 further generates a mesh grid 502 including grid cells 504 defined by lines running through the points of the mesh array 402. For example, the mesh initiator 706 generates the mesh grid 502 by drawing lines connecting adjacent boundary points 302 and interior vertex points 404. In one or more embodiments, the mesh initiator 706 smooths the lines and edges of the mesh grid 502. Alternatively, in one or more embodiments, the mesh initiator 706 simply forms the mesh grid 502 by drawing a straight line between adjacent points of the mesh array 402.

As further shown in FIG. 7, the image warping system 702 includes an image warper 708. In particular, the image warper 708 utilizes the mesh grid 502 to generate an enhanced panoramic image 602 that fits a predetermined shape 604. For example, in one or more embodiments, the image warper 708 skews the mesh grid 502 and underlying panoramic image to fit the predetermined shape 604 while minimizing deviation of a plurality of grid cells 504 of the mesh grid 502. In particular, the image warper 708 warps the mesh grid 502 and underlying pixels of the panoramic image to fit the predetermined shape 604 while distributing the warping of the mesh grid 502 across the grid cells 504 of the mesh grid 502. In one or more embodiments, the image warper 708 warps the mesh grid 502 and underlying pixels of the panoramic image using a global warping technique that minimizes deviation of grid cells 504 from a similarity transform.

In particular, image warping system distributes distortion throughout the mesh grid 502 by minimizing the energy function. For example, in one or more embodiments, the image warping system applies the following total energy function:

$$E(V) = E_S(V) + \lambda E_B(V)$$

where E(V) represents the total energy representative of a vector of all the mesh vertices (V). In one or more embodiments, the values of the mesh vertices (V) are represented by the following equation:

$$V = [x_{11}, x_{12}, \ldots, x_{1n_2}, x_{21}, x_{22}, \ldots, x_{2n_2}, \ldots, x_{n_11}, x_{n_12}, \ldots, x_{n_1 n_2}]$$

where $x_{n_1 n_2}$ represents a vector value at an x-y positions ($n_1$, $n_2$) within the mesh grid 502. Additionally, $E_S(V)$ represents the shape preservation constraint of the total energy function and $E_B(V)$ represents the boundary constraint of the total energy function. A represents a boundary coefficient. In particular, the image warping system can set a hard boundary constraint for the total energy function by setting $\lambda$ to a high value. Thus, the total energy will reflect the dimensions of the rectangular boundary 604 shown in FIG. 6.

As shown in the above total energy function, the total energy of the mesh vertices (V) includes a shape preservation constraint ($E_S(V)$) and a boundary constraint ($E_B(V)$). In one or more embodiments, the shape preservation constraint ($E_S(V)$) is represented using the following equation:

$$E_s(V) = \frac{1}{n} \sum_q \left\| (A_q(A_q^T A_q)^{-1} A_q^T - I) V_q \right\|^2$$

where n represents a number of grid cells 504 of the mesh grid 502, $A_q$ represents coordinate values of input cells and $V_q$ coordinate values of output cells. In particular, $A_q$ is represented by the following:

$$A_q = \begin{bmatrix} \hat{x}_0 & -\hat{y}_0 & 1 & 0 \\ \hat{y}_0 & \hat{x}_0 & 0 & 1 \\ \vdots & \vdots & \vdots & \vdots \\ \hat{x}_3 & -\hat{y}_3 & 1 & 0 \\ \hat{y}_3 & \hat{x}_3 & 0 & 1 \end{bmatrix}$$

where $(\hat{x}_0, \hat{y}_0), \ldots, (\hat{x}_3, \hat{y}_3)$ represent coordinates of input cells. Further, $V_q$ is represented by the following equation:

$$V_q = \begin{bmatrix} x_0 \\ y_0 \\ \vdots \\ x_3 \\ y_3 \end{bmatrix}$$

where $(x_0, y_0), \ldots, (x_3, y_3)$ represent coordinates of output cells.

Additionally, in one or more embodiments, the boundary constraint ($E_B(V)$) is represented using the following equation:

$$E_b(V) = \sum_{V_i \in L} x_i^2 + \sum_{V_i \in R} (x_i - w)^2 + \sum_{V_i \in T} y_i^2 + \sum_{V_i \in B} (y_i - h)^2$$

where L, R, T, and B denote the left, right, top, and bottom boundary edges of the rectangular boundary 604, w represents a width of the rectangular boundary 604 and h represents a height of the rectangular boundary 604. In one or more embodiments, the panoramic warping system utilizes features and functionality by the mesh-based global warping technique described in "Rectangular Panoramic Images via Warping" by Kaiming He, Huiwen Chang, and Jian Sun, which is incorporated by reference herein in its entirety.

As further shown in FIG. 7, the image warping system 702 includes a data storage 710 that includes, for example, image data 712. The image data 712 includes any data associated with the panoramic image including, for example, dimensions, an aspect ratio, and a resolution of the panoramic image. Additionally, where the panoramic image refers to an RGBA image, the image data 712 can include any information contained within the R, B, G, or A channels of the RGBA image. For example, in one or more embodiments, the image data 712 includes any color information (e.g., RGB channel information) as well as any alpha channel information. Moreover, in one or more embodiments, the image data 712 includes an identification of corner points. Further, in one or more embodiments, the image data 712 includes any information determined by the image warping system 702 (e.g., boundary information, vertex point information, etc.).

Each of the components 704-710 of the image warping system 702 and corresponding elements may be in communication with one another using any suitable communication technologies. It will be recognized that although components 704-710 and their corresponding elements are shown to be separate in FIG. 7, any of components 704-710 and their corresponding elements may be combined into fewer components, such as into a single facility or module, divided into more components, or configured into different components as may serve a particular embodiment.

The components 704-710 and their corresponding elements can comprise software, hardware, or both. For example, the components 704-710 and their corresponding elements can comprise one or more instructions stored on a computer-readable storage medium and executable by processors of one or more computing devices. When executed by the one or more processors, the computer-executable instructions of the image warping system 702 can cause a client device and/or a server device to perform the methods described herein. Alternatively, the components 704-710 and their corresponding elements can comprise hardware, such as a special purpose processing device to perform a certain function or group of functions. Additionally, the components 704-710 and their corresponding elements can comprise a combination of computer-executable instructions and hardware.

Furthermore, one or more of the components 704-710 of the image warping system 702 may, for example, be implemented as one or more stand-alone applications, as one or more modules of an application, as one or more plug-ins, as one or more library functions or functions that may be called by other applications, and/or as a cloud-computing model. Thus, one or more of the components 704-710 of the three-dimensional preview generation system 400 may be implemented as a stand-alone application, such as a desktop or mobile application. Furthermore, one or more of the components 704-710 of the image warping system 702 may be implemented as one or more web-based applications hosted on a remote server. Alternatively or additionally, one or more components 704-710 of the image warping system 702 may be implemented in a suit of mobile device applications or "apps." To illustrate, one or more of the components of the image warping system 702 may be implemented in a digital image editing application, including but not limited to ADOBE® PHOTOSHOP® or ADOBE® REVEL®. "ADOBE®," "ADOBE® PHOTOSHOP®," and "ADOBE® REVEL®" are either registered trademarks or trademarks of Adobe Systems Incorporated in the United States and/or other countries.

FIGS. 1-7, the corresponding text, and the example, provide a number of different systems and devices that allows the image warping system 702 to generate an enhanced panoramic image that fits a predetermined boundary by warping a panoramic image with skewed edges. In addition to the foregoing, embodiments can also be described in terms of flowcharts comprising acts and steps in a method for accomplishing a particular result. For example, FIGS. 8-9 illustrates flowcharts of exemplary methods in accordance with one or more embodiments.

Figure 8:
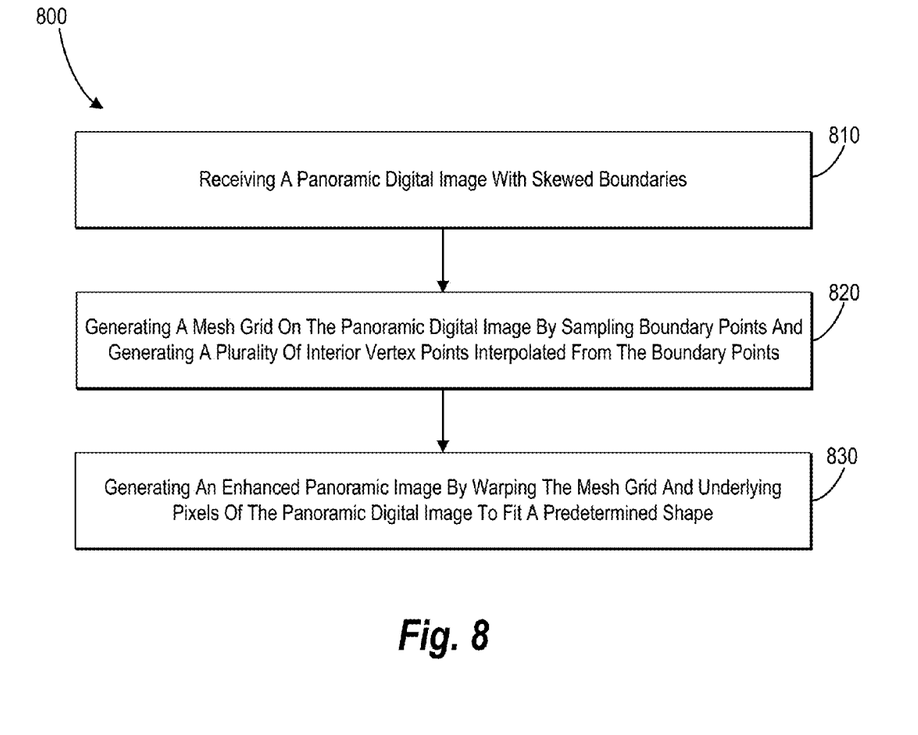
FIG. 8 illustrates a flow chart of a series of acts in a method for warping a panoramic image to fit a predetermined boundary.
Figure 9:
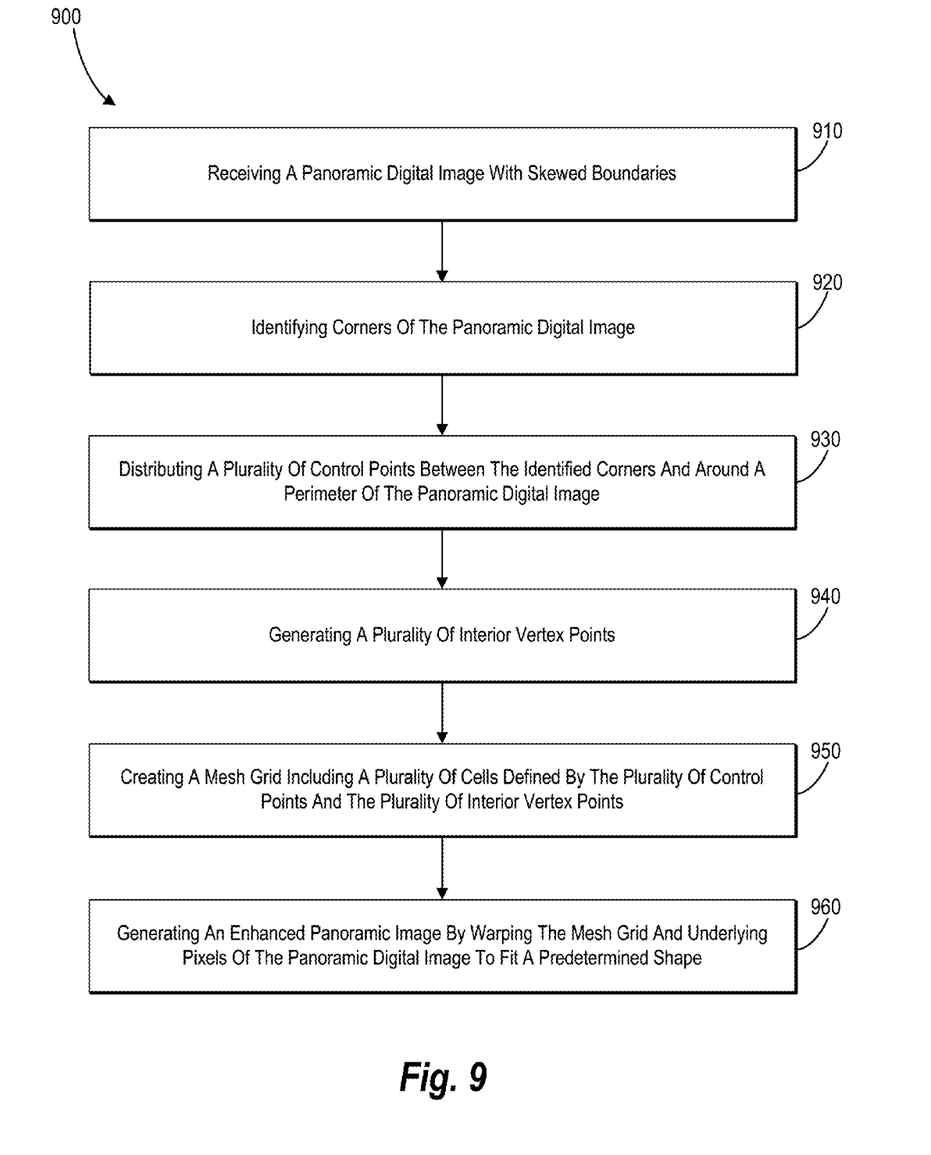
FIG. 9 illustrates a flow chart of a series of acts in another method for warping a panoramic image to fit a predetermined boundary.

FIG. 8 illustrates a flowchart of one example method 800 for modifying a panoramic image independent of content displayed therein. For example, the method 800 relates to warping an input panoramic digital image 102 (or simply "input image 102") to fit a predetermined boundary 604. The method 800 includes an act 810 of receiving a panoramic digital image (e.g., input image 102) with skewed boundaries. In one or more embodiments, the panoramic digital image includes a red green blue alpha (RGBA) panoramic image with skewed boundaries. Additionally, in one or more embodiments, the method 800 includes performing one or more acts of the method 800 without consideration of RGB channels of the panoramic digital image with skewed boundaries.

As further shown in FIG. 8, the method 800 includes an act 820 of generating a mesh grid 502 on the panoramic digital image by sampling boundary points 302 and generating a plurality of interior vertex points 404 interpolated from the boundary points 302. The boundary points and the interior vertex points define cells of the mesh grid. For example, in one or more embodiments, the act 820 includes generating the mesh grid 502 on the panoramic digital image with skewed boundaries by sampling boundary points 302 along outside edges of the panoramic digital image with skewed boundaries. Additionally, in one or more embodiments, the act 820 involves generating the mesh grid 502 on the panoramic digital image with skewed boundaries by generating a plurality of interior vertex points 404 distributed across an interior portion of the panoramic digital image with skewed boundaries by interpolating from the boundary points 302.

In one or more embodiments, generating the mesh grid involves identifying corner points 204a-d of the panoramic digital image with skewed boundaries. In one or more embodiments, the corner points 204a-d or received or otherwise known when the panoramic digital image is received. Alternatively, in one or more embodiments, identifying the corner points 204a-d of the panoramic digital image involves generating a bounding box 202 around the panoramic digital image with skewed boundaries. In one or more embodiments, generating the bounding box 202 involves generating a frame of the panoramic digital image with skewed boundaries, the frame having a shape corresponding to the predetermined shape of the enhanced panoramic image 602.

Further, in one or more embodiments, identifying the corner points 204a-d of the panoramic digital image involves identifying the corner points 204a-d by determining a closest point of the panoramic digital image with skewed boundaries to each corner of the bounding box 202. For example, in one or more embodiments, identifying the corner points 204a-d involves pushing out a forty-five degree line 206 from a corner of the bounding box 202 to a nearest point on the panoramic digital image.

As mentioned above, in one or more embodiments, generating the mesh grid 502 involves sampling boundary points 302 along outside edges of the panoramic digital image. In one or more embodiments, sampling boundary points 302 involves uniformly distributing a plurality of boundary points 302 between the identified corner points 204a-d of the panoramic digital image with skewed boundaries. Further, in one or more embodiments, sampling the boundary points 302 involves generating a number of horizontal boundary points 302 and a number of vertical boundary points 302 based on an aspect ratio of the predetermined shape of the enhanced panoramic image 602.

As further mentioned above, in one or more embodiments, generating the mesh grid 502 involves generating a plurality of interior vertex points 404. In one or more embodiments, generating the plurality of interior vertex points 404 involves interpolating a horizontal and vertical displacement for each of the plurality of vertex points 404 based on horizontal and vertical positions of all of the boundary points 302 within the mesh grid 502 or within the mesh array 402. For example, where the method 800 involves generating a number of horizontal and vertical boundary points 302, generating the plurality of interior vertex points 404 can include evenly distributing a number of interior vertex points 404 corresponding to the number of horizontal boundary points 302 and the number of vertical boundary points 302 to fill out the an interior portion of the mesh grid 502 (or mesh array 402).

In one or more embodiments, generating the plurality of interior vertex points includes interpolating an x-y coordinate from the boundary points by minimizing, for each of the plurality of interior vertex points 404 (e.g., each position of the plurality of interior vertex points 404 within the mesh array 402), a sum of distances from a given interior vertex point 404 to each of the boundary points 302. In one or more embodiments, minimizing the sum of distances from each of the boundary points 302 involves minimizing a sum of weighted distances from each of the boundary points 302. Further, in one or more embodiments, boundary points 302 closer to a given interior vertex point 404 are weighted more heavily than boundary points 302 further from the given interior vertex point 404.

Thus, as described herein, the method 800 can include generating a mesh array 402 including boundary points 302 and interior vertex points 404. Upon generating the mesh array 402, one or more embodiments of the method 800 further includes generating the mesh grid 502 including a grid of lines passing between the boundary points 302 and the interior vertex points 404 to form the plurality of cells 504 of the mesh grid 502.

As further shown in FIG. 8, the method 800 includes an act 830 of generating an enhanced panoramic image 602 by warping each cell of the mesh grid 502 and underlying pixels of the panoramic digital image 102 to fit a predefined shape 604. For example, in one or more embodiments, the act 830 involves generating an enhanced panoramic image 602 by warping the mesh grid 502 and underlying pixels of the panoramic digital image 102 with skewed boundaries to fit a predetermined shape 604 while minimizing deviation of a plurality of cells 504 of the mesh grid 502 defined by the plurality of interior vertex points 404 and the boundary points 302 of the mesh grid 502.

In one or more embodiments, warping the mesh grid 502 and underlying pixels of the panoramic digital image 102 includes warping outer lines of the mesh grid 502 to a hard boundary constraint corresponding to the predefined shape 604. Additionally, one or more embodiments of warping the mesh grid 502 involves minimizing deviation of cells 504 of the mesh grid 502 from a similarity transform applied to the plurality of grid cells 504 by warping each cell.

Additionally, it is appreciated that the predefined shape 604 can include one of several elongated shapes. For example, in one or more embodiments, the predefined shape 604 includes a rectangular shape. Alternatively, in one or more embodiments, the predefined shape refers to an oval, spheroid (e.g., prolate ellipsoid), parallelogram, or other elongated shape.

FIG. 9 illustrates a flowchart of another example method 900 for modifying a panoramic image independent of content displayed therein. For example, the method 900 relates to warping an input panoramic digital image 102 (or simply "input image 102") to fit a predetermined boundary 604. As shown in FIG. 9, the method 900 includes an act 910 of receiving a panoramic digital image with skewed boundaries. Receiving the panoramic digital image can include similar features and functionality described above in connection with the method 800 of FIG. 8.

As further shown in FIG. 9, the method 900 includes an act 920 of identifying corners of the panoramic digital image. For example, in one or more embodiments, identifying the corners involves identifying corner points 204*a-d* of the panoramic digital image with skewed boundaries. As mention above, identifying corner points 204*a-d* can involve generating a bounding box 202 around the panoramic digital image and identifying the closest points on the panoramic digital image to the corners of the bounding box 202.

As further shown in FIG. 9, the method 900 includes an act 930 of distributing a plurality of control points (e.g., boundary points 302) between the identified corners and around a perimeter of the panoramic digital image. For example, in one or more embodiments, the act 930 includes distributing a plurality of control points between the identified corner points 204*a-d* and around a perimeter of the panoramic digital image with skewed boundaries.

Additionally, as shown in FIG. 9, the method 900 includes an act 940 of generating a plurality of interior vertex points 404. For example, in one or more embodiments, the act 940 involves generating a plurality of evenly distributed interior vertex points 404 by minimizing a distance between each of the plurality of interior vertex points 404 and the uniformly distributed control points (e.g., boundary points 302) around the perimeter of the panoramic digital image. In one or more embodiments, generating the plurality of interior vertex points 404 includes calculating a displacement for each of the plurality of vertex points 404 based on a weighted distance from each of the plurality of control points to a given interior vertex point 404.

As further shown in FIG. 9, the method 900 includes an act 950 of creating a mesh grid 502 including a plurality of cells 504 defined by the plurality of control points (e.g., boundary points 302) and the plurality of interior vertex points 404. For example, in one or more embodiments, the act 950 includes creating a mesh grid 502 including a plurality of cells 504 defined by the plurality of control points and the plurality of evenly distributed interior vertex points 404 (e.g., of a grid array 402).

As further shown in FIG. 9, the method includes an act 960 of generating an enhanced panoramic image 602 by warping the mesh grid 502 and underlying pixels of the panoramic digital image to fit a predetermined shape 604. In one or more embodiments, warping the mesh grid and underlying pixels of the panoramic digital image includes distributing distortion across all cells 504 of the mesh grid 502 and corresponding pixels of the panoramic digital image with skewed boundaries. Further, in one or more embodiments, distributing distortion across all cells of the mesh grid includes minimizing deviation of cells 504 of the mesh grid 502 from a similarity transform applied to the plurality of grid cells 504.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In one or more embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as an un-subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing un-subscription model can be composed of various characteristics such as, for example, on-demand self-service, broad network access, resource pooling, rapid elasticity, measured service, and so forth. A cloud-computing un-subscription model can also expose various service un-subscription models, such as, for example, Software as a Service ("SaaS"), a web service, Platform as a Service ("PaaS"), and Infrastructure as a Service ("IaaS"). A cloud-computing un-subscription model can also be deployed using different deployment un-subscription models such as private cloud, community cloud, public cloud, hybrid cloud, and so forth. In this description and in the claims, a "cloud-computing environment" is an environment in which cloud computing is employed.

Figure 10:
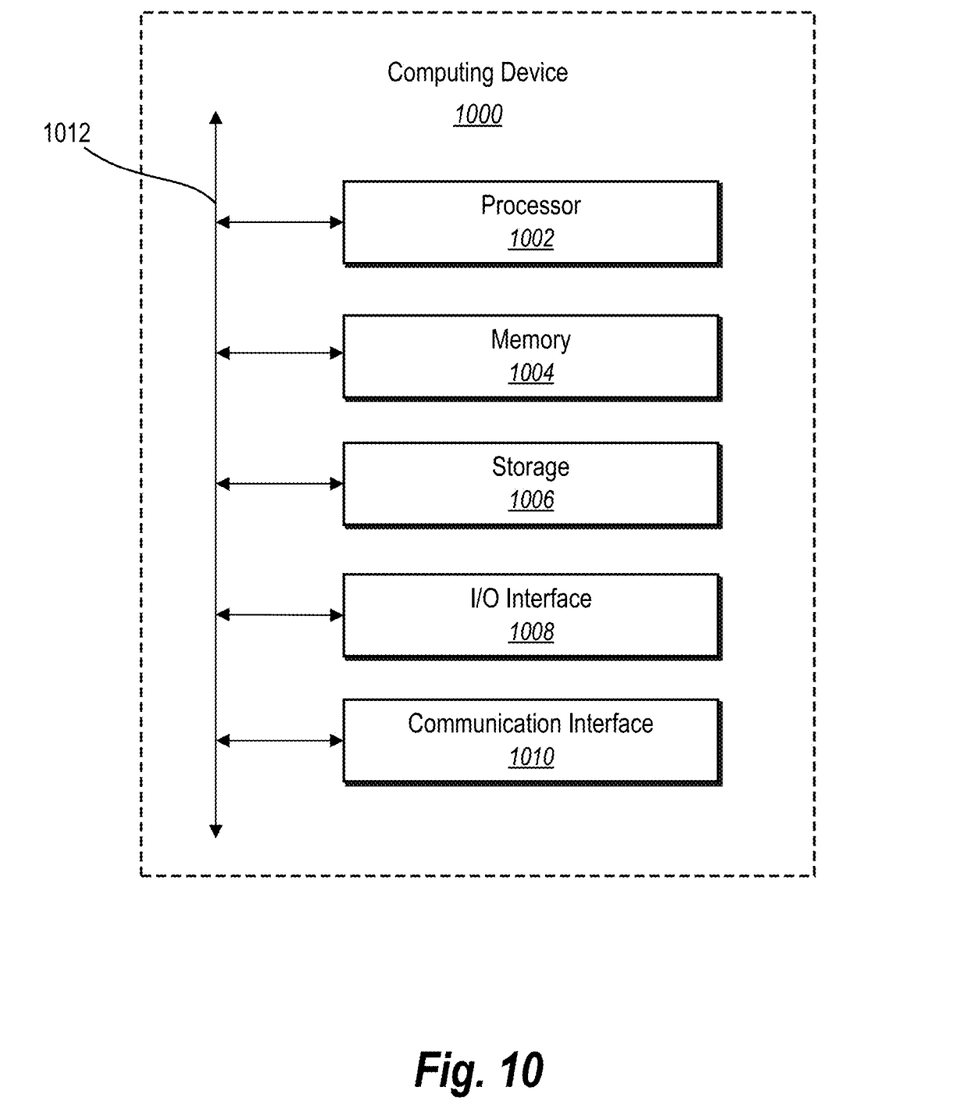
FIG. 10 illustrates a block diagram of an exemplary computing device in accordance with one or more embodiments.

FIG. 10 illustrates a block diagram of exemplary computing device 1000 that may be configured to perform one or more of the processes described above. As shown by FIG. 10, the computing device 1000 can comprise a processor 1002, a memory 1004, a storage device 1006, an I/O interface 1008, and a communication interface 1010, which may be communicatively coupled by way of a communication infrastructure 1012. In certain embodiments, the computing device 1000 can include fewer or more components than those shown in FIG. 10. Components of the computing device 1000 shown in FIG. 10 will now be described in additional detail.

In one or more embodiments, the processor 1002 includes hardware for executing instructions, such as those making up a computer program. As an example and not by way of limitation, to execute instructions for digitizing real-world objects, the processor 1002 may retrieve (or fetch) the instructions from an internal register, an internal cache, the memory 1004, or the storage device 1006 and decode and execute them. The memory 1004 may be a volatile or non-volatile memory used for storing data, metadata, and programs for execution by the processor(s). The storage device 1006 includes storage, such as a hard disk, flash disk drive, or other digital storage device, for storing data or instructions related to object digitizing processes (e.g., digital scans, digital models).

The I/O interface 1008 allows a user to provide input to, receive output from, and otherwise transfer data to and receive data from computing device 1000. The I/O interface 1008 may include a mouse, a keypad or a keyboard, a touch screen, a camera, an optical scanner, network interface, modem, other known I/O devices or a combination of such I/O interfaces. The I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1008 is configured to provide graphical data to a display for presentation to a user. The graphical data may be representative of one or more graphical user interfaces and/or any other graphical content as may serve a particular implementation.

The communication interface 1010 can include hardware, software, or both. In any event, the communication interface 1010 can provide one or more interfaces for communication (such as, for example, packet-based communication) between the computing device 1000 and one or more other computing devices or networks. As an example and not by way of limitation, the communication interface 1010 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1010 may facilitate communications with various types of wired or wireless networks. The communication interface 1010 may also facilitate communications using various communication protocols. The communication infrastructure 1012 may also include hardware, software, or both that couples components of the computing device 1000 to each other. For example, the communication interface 1010 may use one or more networks and/or protocols to enable a plurality of computing devices connected by a particular infrastructure to communicate with each other to perform one or more aspects of the digitizing processes described herein. To illustrate, the image compression process can allow a plurality of devices (e.g., server devices for performing image processing tasks of a large number of images) to exchange information using various communication networks and protocols for exchanging information about a selected workflow and image data for a plurality of images.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. In a digital medium environment for modifying panoramic images independent of content displayed therein, a method for warping panoramic images to correct skewed boundaries, the method comprising:
   receiving a panoramic digital image with skewed boundaries;
   generating a mesh grid on the panoramic digital image, said generating comprising: sampling boundary points along outside edges of the panoramic digital image and generating a plurality of interior vertex points by interpolating from the boundary points, the boundary points and interior vertex points defining cells of the mesh grid; and
   generating an enhanced panoramic image by warping the mesh grid and underlying pixels of the panoramic digital image to fit a predetermined shape.

2. The method of claim 1, wherein generating the mesh grid further comprises identifying corner points of the panoramic digital image.

3. The method of claim 2, wherein identifying the corner points of the panoramic digital image comprises:
   generating a bounding box around the panoramic digital image; and
   determining a closest point along the outside edges of the panoramic digital image to each corner of the bounding box.

4. The method of claim 3, wherein generating the bounding box comprises generating a rectilinear shape around the panoramic digital image, wherein the bounding box fully encloses the panoramic digital image and each side of the bounding box touches an outer edge of the panoramic digital image.

5. The method of claim 2, wherein generating the mesh grid comprises sampling the boundary points along outside edges of the panoramic digital image by uniformly distributing a plurality of boundary points between the corner points of the panoramic digital image.

6. The method of claim 5, wherein sampling the boundary points along outside edges of the panoramic digital image comprises generating a number of horizontal boundary points and a number of vertical boundary points based on an aspect ratio of the predetermined shape of the enhanced panoramic image.

7. The method of claim 6, wherein generating the mesh grid comprises generating the plurality of interior vertex points by evenly distributing a number of interior vertex points throughout an interior portion of the mesh grid to be proportional to the number of horizontal boundary points and the number of vertical boundary points.

8. The method of claim 1, wherein generating mesh grid comprises generating the plurality of interior vertex points by interpolating a horizontal displacement and a vertical displacement for each of the plurality of interior vertex points based on horizontal and vertical positions of all of the boundary points.

9. The method of claim 1, wherein generating the mesh grid comprises generating the plurality of interior vertex points by interpolating an x-y coordinate from the boundary points, wherein interpolating the x-y coordinate from the boundary points comprises minimizing, for each of the plurality of interior vertex points, a sum of distances from a given interior vertex point to each of the boundary points.

10. The method of claim 9, wherein minimizing the sum of distances from each of the boundary points comprises minimizing a sum of weighted distances from each of the boundary points, wherein boundary points closer to a given interior vertex point are weighted more heavily than boundary points further from the given interior vertex point.

11. The method of claim 1, wherein warping the mesh grid and underlying pixels of the panoramic digital image comprises:
   warping outer lines of the mesh grid to a hard boundary constraint corresponding to the predetermined shape; and
   minimizing deviation of cells of the mesh grid by warping each cell.

12. The method of claim 1, wherein the panoramic digital image comprises a red green blue alpha (RGBA) panoramic image with skewed boundaries, and wherein generating the mesh grid is performed without consideration of red green blue (RGB) channels of the panoramic digital image with skewed boundaries.

13. In a digital medium environment for modifying panoramic images independent of content displayed therein, a method for warping panoramic images to correct skewed boundaries, the method comprising:
   receiving a panoramic digital image;
   identifying corner points of the panoramic digital image;
   distributing a plurality of control points between the identified corner points and around a perimeter of the panoramic digital image;
   generating a plurality of evenly distributed interior vertex points based on the control points;
   creating a mesh grid comprising a plurality of cells defined by the plurality of control points and the plurality of evenly distributed interior vertex points; and
   generating an enhanced panoramic image by warping the mesh grid and underlying pixels of the panoramic digital image to fit a predetermined shape.

14. The method of claim 13, wherein generating the plurality of evenly distributed interior vertex points comprises calculating a displacement for each of the plurality of evenly distributed interior vertex points based on a weighted distance from each of the plurality of control points to a given interior vertex point of the plurality of evenly distributed interior vertex points.

15. The method of claim 14, wherein warping the mesh grid and underlying pixels of the panoramic digital image comprises distributing distortion across all cells of the mesh grid.

16. The method of claim 15, wherein distributing distortion across all cells of the mesh grid comprises minimizing deviation of cells of the mesh grid from a similarity transform applied to the plurality of cells.

17. The method of claim 14, wherein the mesh grid has an irregular shape corresponding to an irregular shape of the panoramic digital image.

18. A system modifying panoramic images independent of content displayed therein, the system comprising:
   at least one processor; and
   a non-transitory storage medium comprising instructions thereon that, when executed by the at least one processor, cause the system to:
      receive a panoramic digital image with an irregular shape;

generate a mesh grid on the panoramic digital image with the irregular shape by evenly distributing a plurality of interior vertex points across the panoramic digital image, the mesh grid having a shape corresponding to the irregular shape of the panoramic digital image; and generate an enhanced panoramic image by warping the mesh grid and underlying pixels of the panoramic digital image to fit a predetermined shape while evenly distributing at least a portion of the warping of the mesh grid and underlying pixels of the panoramic digital image across each cell of a plurality of cells of the mesh grid.

19. The system of claim 18, further comprising instructions, that when executed by the at least one processor, cause the system to generate the mesh grid on the panoramic digital image by performing steps comprising:

sampling boundary points along outside edges of the panoramic digital image by uniformly distributing a plurality of boundary points around a perimeter of the panoramic digital image, generating the plurality of interior vertex points distributed across an interior portion of the panoramic digital image by interpolating from the boundary points.

20. The system of claim 19, wherein the instructions, when executed by the at least one processor, further cause the system to identify corner points of the panoramic digital image, and wherein:

sampling the boundary points comprises uniformly distributing the plurality of boundary points between the identified corner points of the panoramic digital image; and generating the plurality of interior vertex points comprises calculating an x-y coordinate within the mesh grid for each of the plurality of boundary points based on a relative position of the plurality of boundary points to each of the plurality of interior vertex points.

* * * * *